United States Patent
Hsu et al.

(10) Patent No.: US 8,915,477 B2
(45) Date of Patent: Dec. 23, 2014

(54) AUXILIARY SUPPORT DEVICE FOR FLIP TOUCH SCREEN

(71) Applicant: First Dome Corporation, New Taipei (TW)

(72) Inventors: An Szu Hsu, Taipei (TW); Way Han Dai, New Taipei (TW); Hsiu Fan Ho, New Taipei (TW)

(73) Assignee: First Dome Corporation, New Taipei (TW)

( * ) Notice: Subject to any disclaimer, the term of this patent is extended or adjusted under 35 U.S.C. 154(b) by 161 days.

(21) Appl. No.: 13/644,463

(22) Filed: Oct. 4, 2012

(65) Prior Publication Data

US 2014/0097316 A1   Apr. 10, 2014

(51) Int. Cl.
*A47G 29/00* (2006.01)

(52) U.S. Cl.
USPC ......... 248/371; 248/917; 248/176.1; 248/923

(58) Field of Classification Search
CPC ....... H05K 7/00; F16M 13/022; A47B 81/061
USPC ................. 248/917, 371, 176.1, 297.31, 923; 361/679.05, 679.01
See application file for complete search history.

(56) References Cited

U.S. PATENT DOCUMENTS

| | | | | |
|---|---|---|---|---|
| 7,925,310 | B2 * | 4/2011 | Chiu | 455/575.1 |
| 8,353,083 | B2 * | 1/2013 | Wu et al. | 16/362 |
| 2005/0128695 | A1 * | 6/2005 | Han | 361/683 |
| 2013/0112829 | A1 * | 5/2013 | Stengel | 248/297.31 |

* cited by examiner

*Primary Examiner* — Amy J Sterling
(74) *Attorney, Agent, or Firm* — Rosenberg, Klein & Lee

(57) ABSTRACT

An auxiliary support device for flip touch screen includes a main body and an upper cover having a touch panel. The main body is preformed with a cavity for assembling with a base seat. The upper cover is preformed with an elongated recess corresponding to the cavity. A slide rail is assembled in the elongated recess. One end of a link member is movably pivotally connected with an outer end of the base seat. A bottom end of a slide member is movably pivotally connected with an inner end of the base seat. The slide member is assembled in the slide rail. The other end of the link member is slidably connected with of a surface of the slide member. When the upper cover is turned upward, the link member is turned upward with the slide member to obliquely support the upper cover.

14 Claims, 8 Drawing Sheets

AUXILIARY SUPPORT DEVICE FOR FLIP TOUCH SCREEN

BACKGROUND OF THE INVENTION

1. Field of the Invention

The present invention relates generally to an auxiliary support device for flip touch screen, and more particularly to an auxiliary support device especially applicable to a flip electronic apparatus. When the upper cover of the electronic apparatus is turned upward, the auxiliary support device is turned upward along with the upper cover to help in supporting the upper cover. The use angle and force of the auxiliary support device can be adjusted to meet the application requirements of different kinds of electronic apparatuses.

2. Description of the Related Art

A conventional electronic apparatus such as a notebook computer generally has a main body as a fixed system side and a pivotally turnable upper cover having a liquid crystal screen. The upper cover is connected with the main body via pivot units or the like at opposite ends. Accordingly, the upper cover can be rotated upward around the pivot units into a working state or rotated downward and closed onto the surface of the main body. Such electronic apparatus has different structure according to different design. In some designs, the opposite ends of the main body and the upper cover are directly movably pivotally connected. In some other designs, the main body system side is disposed under the upper cover and the upper cover can be first horizontally slid relative to the main body system side and then rotated upward.

Also, the current electronic apparatus generally employs a touch panel as the liquid crystal screen. In all the above structural designs, the upper cover is generally opened and located in a tilted position in a loaded state for a user's finger to touch the touch panel (liquid crystal screen). The touch section of the touch panel is spaced from the pivot units by a certain distance. When applying a force to the touch panel, the effort moment is considerably great so that the pivot units are likely to damage. In this case, it is hard to provide a true locating effect for the upper cover to keep the upper cover in a desired angular position. Moreover, the support force for the liquid crystal screen is insufficient so that the screen of the electronic apparatus such as a notebook computer can be hardly stably operated without shaking.

The above shortcoming is obvious, especially in a slider electronic apparatus. This is because in the slider electronic apparatus, it is necessary to first slide the upper cover along a slide mechanism relative to the main body by a certain distance and then turn the upper cover upward around the rotary shaft by a certain angle and then locate the upper cover in an angular working position by a support structure. The conventional support structure of the slider electronic apparatus usually has insufficient strength for keeping the screen in a stable operation state without shaking. Furthermore, such slider electronic apparatus employs complicated slide mechanism with a considerable thickness. Therefore, it is tried by the applicant to provide an auxiliary support device for flip touch screen, which helps in supporting the upper cover without increasing the volume or thickness of the electronic apparatus.

SUMMARY OF THE INVENTION

It is therefore a primary object of the present invention to provide an auxiliary support device for flip touch screen. When the upper cover of the electronic apparatus is turned upward, the auxiliary support device is turned upward along with the upper cover to obliquely support the upper cover as a reinforcement structure. Under such circumstance, the touch liquid crystal screen of the slider electronic apparatus can be more stably operated without shaking.

It is a further object of the present invention to provide the above auxiliary support device for flip touch screen. The use angle and force can be adjusted according to different structural designs of different lengths and positions to meet the application requirements of different kinds of electronic apparatuses.

To achieve the above and other objects, the auxiliary support device for flip touch screen of the present invention includes a main body as a system side and an upper cover having a touch panel liquid crystal screen. The main body is preformed with a cavity for assembling with a base seat. The upper cover is preformed with an elongated recess in a position corresponding to the cavity. A slide rail is assembled in the elongated recess. One end of a link member is movably pivotally connected with an outer end of the base seat. A bottom end of a slide member is movably pivotally connected with an inner end of the base seat. The slide member is slidably assembled in the slide rail. The other end of the link member is slidably connected with a preset section of a surface of the slide member. When the upper cover is turned upward, the link member is turned upward with the slide member to obliquely support the upper cover.

In the above auxiliary support device, elastic members are disposed under the link member near a movable pivoted end between the end of the link member and the outer end of the base seat. The compression extent of the elastic members varies with the change of the position of the link member. Therefore, the elastic members can transmit different forces to the link member. Accordingly, the use angle and force can be adjusted according to different structural designs of different lengths and positions to meet the application requirements of different kinds of electronic apparatuses.

In the above auxiliary support device, the surface of the base seat is preformed with blind holes and opposite pillars are disposed under the link member in positions corresponding to the blind holes. One end of the elastic member is rested in the blind hole, while the other end of the elastic member is fitted on the pillar.

In the above auxiliary support device, the bottom end of the slide member is a sleeve section. A pivot unit and a support shaft are oppositely disposed on the base seat for movably pivotally connecting with the sleeve section. The opposite pivot unit and support shaft are cooperatively inserted in the sleeve section as the shaft and locating torque mechanism for the bottom end of the slide member.

In the above auxiliary support device, the pivot unit is disposed atone end of a locating bar. The locating bar is locked in the cavity of the main body. The base seat is formed with an outward bent plate for concealing and protecting the locating bar. The outward bent plate is preformed with a concaved section for receiving the pivot unit. The base seat has a forked end. A connection seat is disposed in the cavity of the main body in a position corresponding to the forked end. The locating bar has an extension end. The extension end extends into the connection seat and is locked and connected with the connection seat by means of a locking member. The support shaft is located in a corresponding through hole preformed on an end section of the base seat.

In the above auxiliary support device, the end of the link member has two lugs spaced from each other. The outer end of the base seat is formed with two opposite dents each having a shaft corresponding to the lug. The end of the link member is assembled with the dents with the shafts movably pivotally connected in the lugs. The other end of the link member has laterally protruding shaft sections. The slide member is formed with opposite inner holding channels on one face of the slide member in predetermined positions, whereby the other end of the link member is slidably assembled with the inner holding channels. The other face of the slide member is formed with outer holding channels. The slide rail fixed in the elongated recess of the upper cover is formed with lateral wing sections, which are formed by means of continuously bending two sides of the slide rail. The lateral wing sections are slidably assembled in the outer holding channels of the slide member.

In the above auxiliary support device, the other end of the link member has laterally protruding shaft sections. The slide member is formed with opposite inner holding channels on one face of the slide member in predetermined positions, whereby the other end of the link member is slidably assembled with the inner holding channels. The inner holding channels of the slide member extend from the bottom end to the other end by a predetermined length. Pad blocks with a predetermined height are disposed in the base seat in a position displaced from the inner holding channels, whereby when the slide member overlaps the base seat, the link member is horizontally located in a space defined by the inner holding channels and the pad blocks. Accordingly, the auxiliary support components are completely received in the base seat in an overlapping state.

The present invention can be best understood through the following description and accompanying drawings, wherein:

DETAILED DESCRIPTION OF THE PREFERRED EMBODIMENTS

Figure 1:
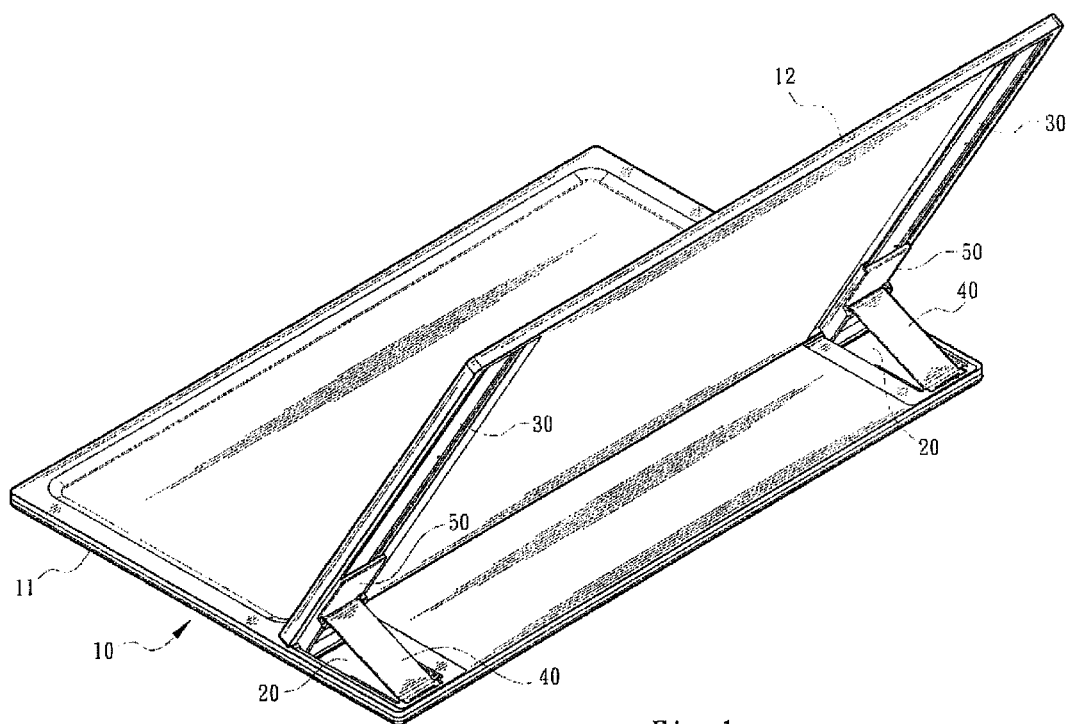
FIG. 1 is a perspective view of a preferred embodiment of the present invention, in which the upper cover of the electronic apparatus is turned open and located.

Please refer to FIG. 1, which shows a slider electronic apparatus 10 including a main body 11 as a system side and an upper cover 12 generally having a touch panel (liquid crystal screen). The upper cover 12 can be first horizontally slid on the upper surface of the main body 11 and then turned upward and located in an operation position as shown in FIG. 1. The auxiliary support device of the present invention is disposed between the main body 11 and the upper cover 12.

Figure 2:
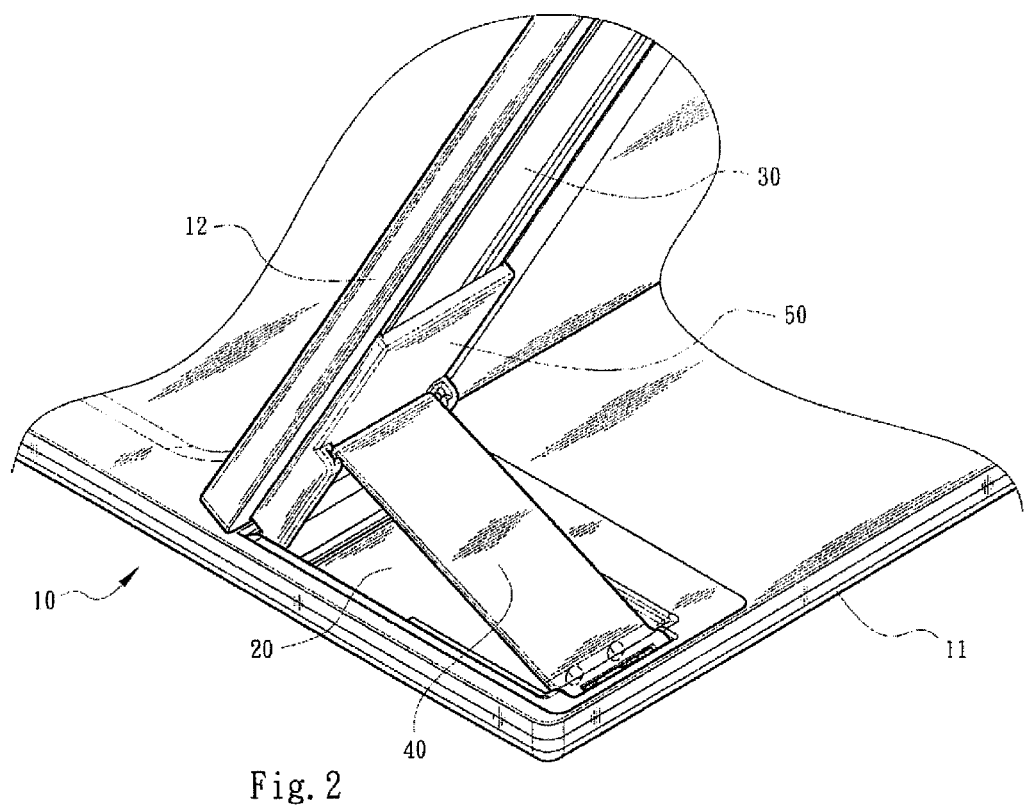
FIG. 2 is an enlarged view of one side of FIG. 1.
Figure 3:
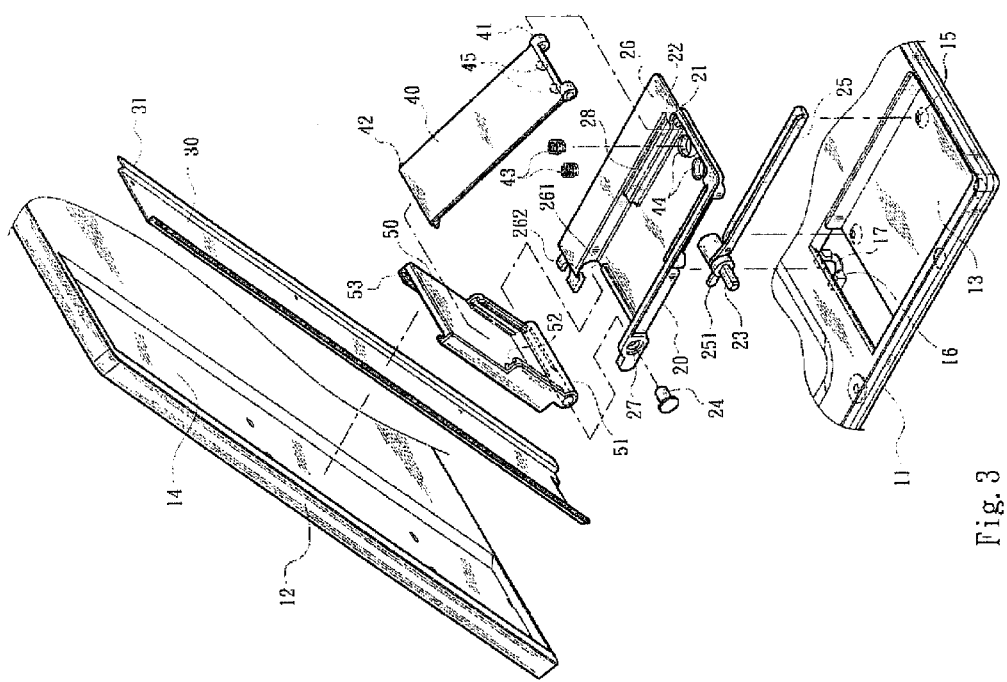
FIG. 3 is a perspective exploded view of the preferred embodiment of the present invention according to FIG. 2.

Please refer to FIGS. 2 and 3. In a preferred embodiment, the main body 11 of the electronic apparatus is preformed with a cavity 13 for assembling with a base seat 20. The upper cover 12 is preformed with an elongated recess 14 in a position corresponding to the cavity 13. A slide rail 30 is assembled in the elongated recess 14. One end 41 of a link member 40 is movably pivotally connected with an outer end of the base seat 20. A bottom end 51 of a slide member 50 is movably pivotally connected with an inner end of the base seat 20. The slide member 50 is slidably assembled in the slide rail 30. The other end 42 of the link member 40 is slidably connected with a preset section of a surface of the slide member 50.

In this embodiment, the end 41 of the link member 40 has two lugs spaced from each other. The outer end of the base seat 20 is formed with two opposite dents 22 each having a shaft 21 corresponding to the lug. Accordingly, the end 41 of the link member 40 can be assembled with the dents 22 with the shafts 21 movably pivotally connected in the lugs. In this case, the other end 42 of the link member 40 can be rotated around the movable pivoted point.

Elastic members 43 are disposed under the link member 40 near the movable pivoted end between the end 41 of the link member 40 and the outer end of the base seat 20. The compression extent of the elastic members 43 varies with the change of position of the link member 40, whereby the elastic members 43 can transmit different forces to the link member 40. In this embodiment, the surface of the base seat 20 is preformed with blind holes 44 and opposite pillars 45 are disposed under the link member 40 in positions corresponding to the blind holes 44. One end of the elastic member 43 is rested in the blind hole 44, while the other end of the elastic member 43 is fitted on the pillar 45.

In this embodiment, the other end 42 of the link member 40 has laterally protruding shaft sections. The slide member 50 is formed with opposite inner holding channels 52 on one face of the slide member 50 in predetermined positions. Accordingly, the other end 42 of the link member 40 can be slidably assembled with the inner holding channels 52. Also, in this embodiment, the other face of the slide member 50 is formed with outer holding channels 53. The slide rail 30 fixed in the elongated recess 14 of the upper cover 12 is formed with lateral wing sections 31, which are formed by means of continuously bending two sides of the slide rail 30. The lateral wing sections 31 are slidably assembled in the outer holding channels 53 of the slide member 50.

Figure 4:
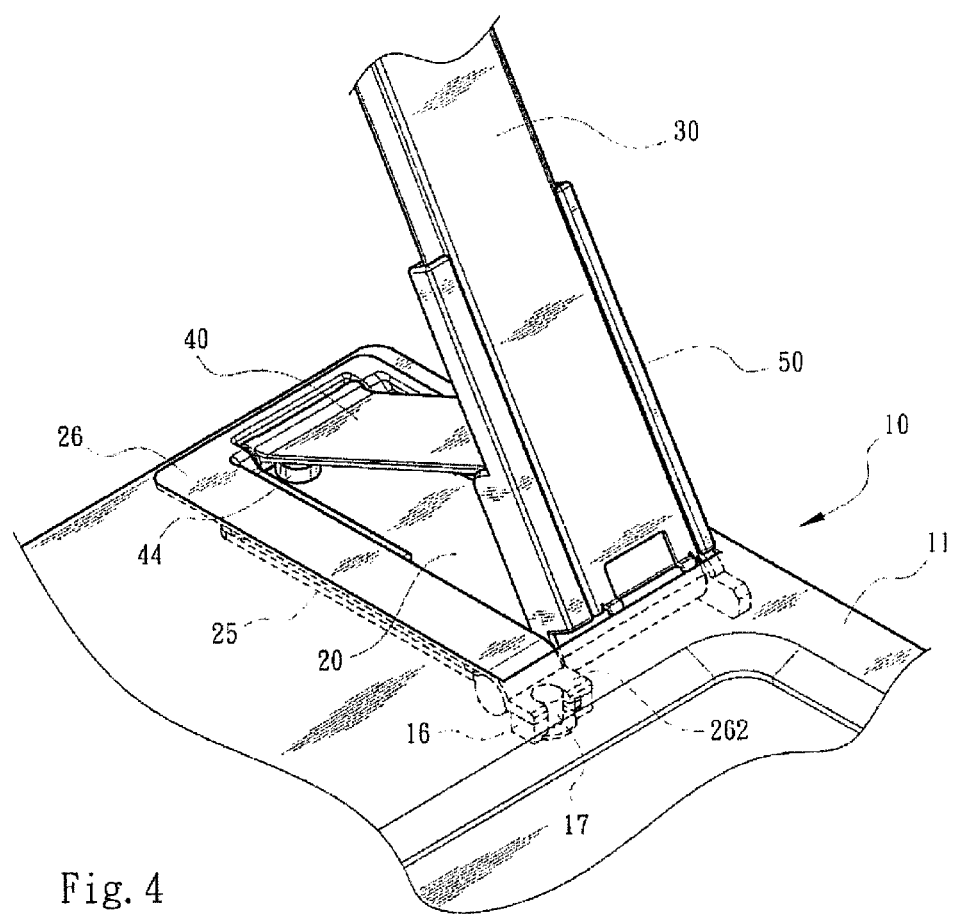
FIG. 4 is a perspective assembled view according to FIG. 3, seen from another angle.
Figure 5:
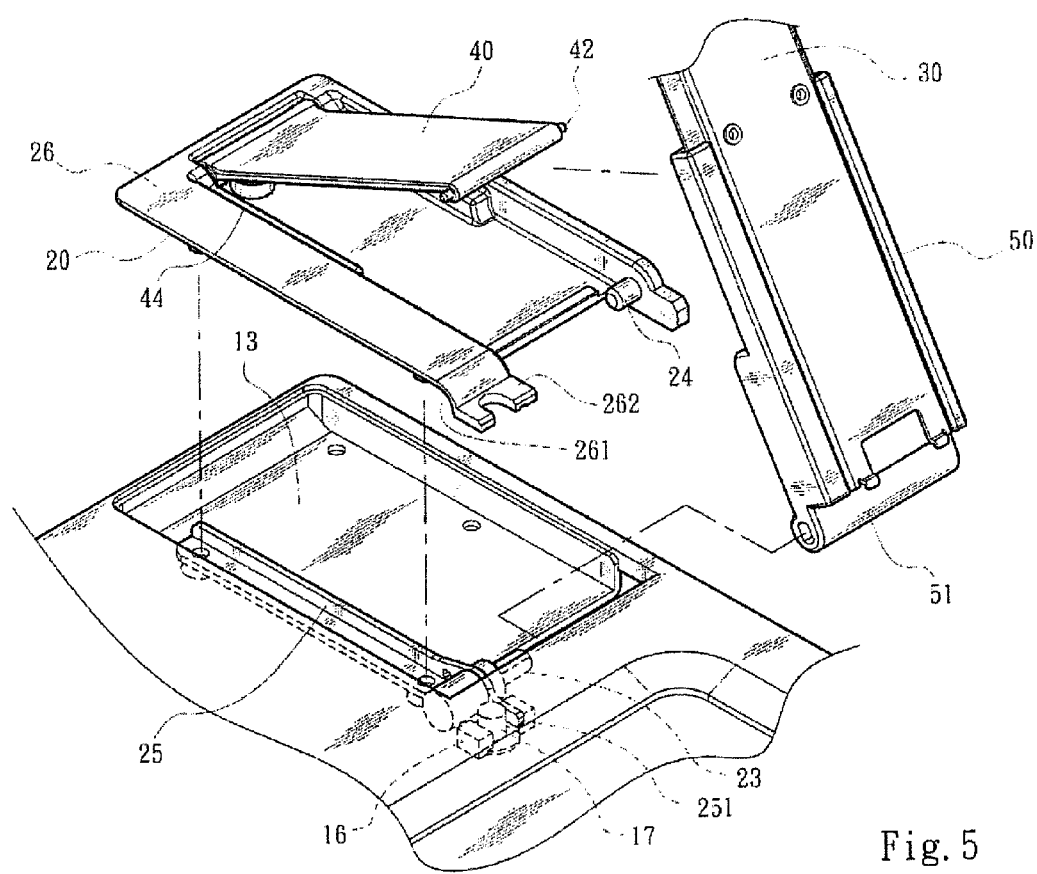
FIG. 5 is a perspective exploded view according to FIG. 4.

In this embodiment, the bottom end 51 of the slide member 50 is a sleeve section. A pivot unit 23 and a support shaft 24 are oppositely disposed on the base seat 20 for movably pivotally connecting with the sleeve section. Please refer to FIGS. 3 and 4. The pivot unit 23 is disposed at one end of a locating bar 25. Relevant torque and locating mechanisms are previously disposed inside the pivot unit 23 to provide locating and torque supporting effect for the upper cover when turned upward. The locating bar 25 is locked at inner threaded holes 15 preformed in the cavity 13 of the main body 11. The base seat 20 is formed with an outward bent plate 26 for concealing and protecting the locating bar 25. An inner front end of the outward bent plate 26 is preformed with a concaved section 261 for receiving the body of the pivot unit 23. In addition, the outward bent plate 26 of the base seat 20 has a forked end 262 cooperating with a connection seat 16 disposed in the cavity 13 of the main body 11 for providing an extension end 251 of the locating bar 25 to extend into the connection seat 16 and is locked and connected with the connection seat 16 by means of a locking member 17 (as shown in FIG. 5). The support shaft 24 is located in a corresponding through hole 27 preformed on an end section of the base seat 20. The opposite pivot unit 23 and the support shaft 24 are cooperatively inserted in the sleeve section as the shaft and locating torque mechanism for the bottom end 51 of the slide member 50.

The opposite inner holding channels 52 of the slide member 50 extend from the bottom end 51 to the other end by a certain length. In this embodiment, the length of the inner holding channels 52 is about half the length of the slide member 50. Pad blocks 28 with a predetermined height are disposed in the base seat 20 in a position displaced from the inner holding channels 52. When the slide member 50 overlaps the base seat 20, the link member 40 can be horizontally located in a space defined by the inner holding channels 52 and the pad blocks 28. Accordingly, the auxiliary support components are completely received in the base seat 20 in an overlapping state.

Figure 6:
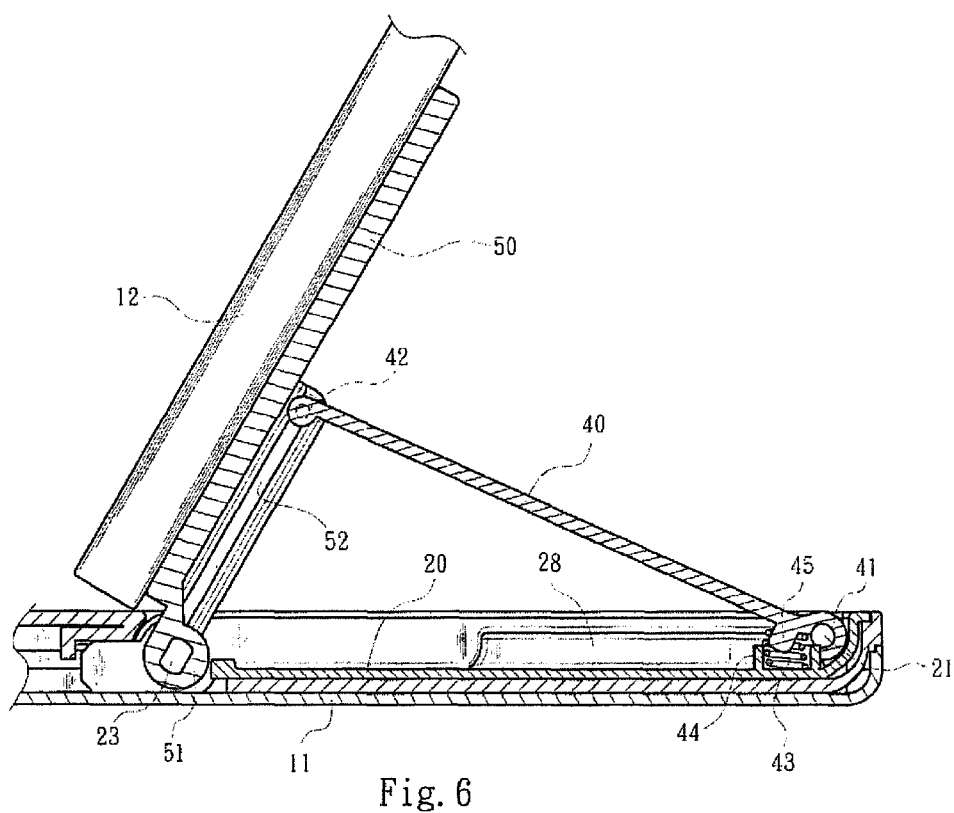
FIG. 6 is a sectional view according to FIG. 2.
Figure 7:
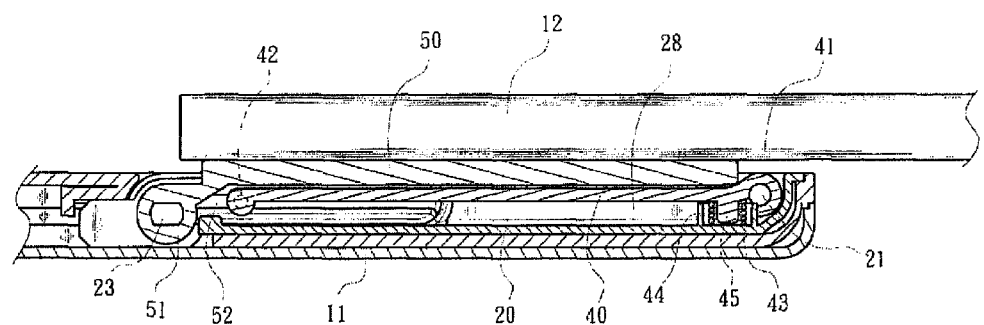
FIG. 7 is a sectional view according to FIG. 6, in which the upper cover is in a closed state.
Figure 8:
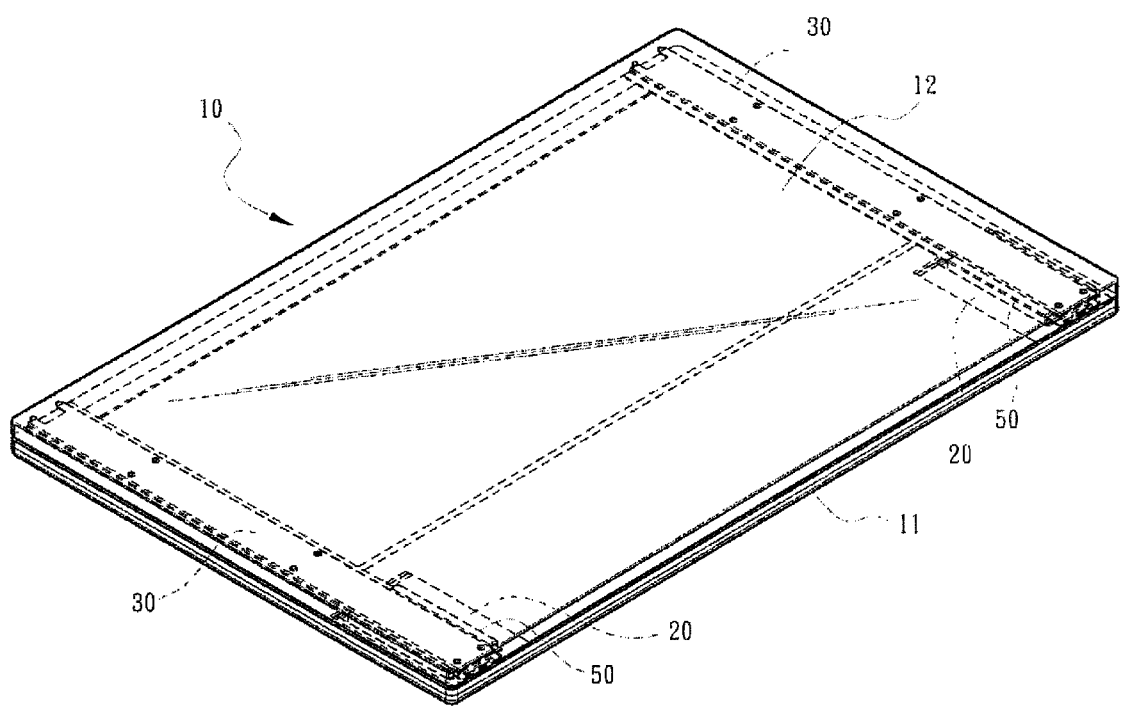
FIG. 8 is a perspective view showing that the present invention is installed on an electronic apparatus.

As shown in FIGS. 1 and 8, the present invention is installed on opposite inner sides of two ends of the main body 11 and the upper cover 12 of the electronic apparatus. The other end 42 of the link member 40 is rotated around the end 41 of the link member 40 and pushed/slid to the bottom of the inner holding channels 52 of the slide member 50. At this time, the link member 40 is pressed onto the base seat 20 into a horizontal position. In the meantime, the slide member 50 is also rotated around the bottom end 51 and pressed onto the surface of the link member 40 into a horizontal position overlapping the link member 40. When the upper cover is horizontally slid outward as shown in FIG. 7, the slide rail 30 is also outward pushed to a predetermined position relative to the slide member 50. Then, as shown in FIG. 6, the upper cover 12 can be turned upward around the pivot unit 23 and the support shaft 24 inserted in the sleeve section. During the turning process, the upper end of the slide member 50 is turned upward around the bottom end 51. At the same time, the other end 42 of the link member 40 is lifted, whereby the link member 40 is positioned in an inclined position to support the upper cover 12 as shown in FIGS. 1 and 6.

After the upper cover is turned upward to a fixed position, the link member helps in supporting the upper cover. When a user presses and applies a force to the touch panel of the upper cover 12, not only the pivot unit 23 provides a supporting/locating effect for the upper cover 12, but also the link member 40 obliquely supports the upper cover 12 to reinforce the upper cover support structure. Under such circumstance, the touch screen of the slider electronic apparatus can be more stably operated without shaking. Also, the compression extent of the elastic members 43 varies with the change of the position of the link member 40. Therefore, the elastic members 43 can transmit different forces to the link member 40. Accordingly, the use angle and force can be adjusted according to different structural designs of different lengths and positions to meet the application requirements of different kinds of electronic apparatuses.

The above embodiments are only used to illustrate the present invention, not intended to limit the scope thereof. Many modifications of the above embodiments can be made without departing from the spirit of the present invention.

What is claimed is:

1. An auxiliary support device for flip touch screen, comprising a main body as a system side and an upper cover having a touch panel liquid crystal screen, the main body being preformed with a cavity for assembling with a base seat, the upper cover being preformed with an elongated recess in a position corresponding to the cavity, a slide rail being assembled in the elongated recess, one end of a link member being movably pivotally connected with an outer end of the base seat, a bottom end of a slide member being movably pivotally connected with an inner end of the base seat, the slide member being slidably assembled in the slide rail, the other end of the link member being slidably connected with a preset section of a surface of the slide member;

wherein elastic members are disposed under the link member near a movable pivoted end between the end of the link member and the outer end of the base seat; and the surface of the base seat is preformed with blind holes and opposite pillars are disposed under the link member in positions corresponding to the blind holes, one end of the elastic member being rested in the blind hole, while the other end of the elastic member being fitted on the pillar.

2. The auxiliary support device for flip touch screen as claimed in claim 1, wherein the bottom end of the slide member is a sleeve section, a pivot unit and a support shaft being oppositely disposed on the base seat for movably pivotally connecting with the sleeve section.

3. The auxiliary support device for flip touch screen as claimed in claim 2, wherein the pivot unit is disposed at one end of a locating bar, the locating bar being locked in the cavity of the main body, the base seat being formed with an outward bent plate for concealing and protecting the locating bar, the outward bent plate being preformed with a concaved section for receiving the pivot unit, the base seat having a forked end, a connection seat being disposed in the cavity of the main body in a position corresponding to the forked end, the locating bar having an extension end, the extension end extending into the connection seat and being locked and connected with the connection seat by means of a locking member, the support shaft being located in a corresponding through hole preformed on an end section of the base seat.

4. The auxiliary support device for flip touch screen as claimed in claim 1, wherein the end of the link member has two lugs spaced from each other, the outer end of the base seat being formed with two opposite dents each having a shaft corresponding to the lug, the end of the link member being assembled with the dents with the shafts movably pivotally connected in the lugs, the other end of the link member having laterally protruding shaft sections, the slide member being formed with opposite inner holding channels on one face of the slide member in predetermined positions, whereby the other end of the link member is slidably assembled with the inner holding channels, the other face of the slide member being formed with outer holding channels, the slide rail fixed in the elongated recess of the upper cover being formed with lateral wing sections, which are formed by means of continuously bending two sides of the slide rail, the lateral wing sections being slidably assembled in the outer holding channels of the slide member.

5. The auxiliary support device for flip touch screen as claimed in claim 2, wherein the end of the link member has two lugs spaced from each other, the outer end of the base seat being formed with two opposite dents each having a shaft corresponding to the lug, the end of the link member being assembled with the dents with the shafts movably pivotally connected in the lugs, the other end of the link member having laterally protruding shaft sections, the slide member being formed with opposite inner holding channels on one face of the slide member in predetermined positions, whereby the other end of the link member is slidably assembled with the inner holding channels, the other face of the slide member being formed with outer holding channels, the slide rail fixed in the elongated recess of the upper cover being formed with lateral wing sections, which are formed by means of continuously bending two sides of the slide rail, the lateral wing sections being slidably assembled in the outer holding channels of the slide member.

6. The auxiliary support device for flip touch screen as claimed in claim 3, wherein the end of the link member has two lugs spaced from each other, the outer end of the base seat being formed with two opposite dents each having a shaft corresponding to the lug, the end of the link member being assembled with the dents with the shafts movably pivotally connected in the lugs, the other end of the link member having laterally protruding shaft sections, the slide member being formed with opposite inner holding channels on one face of the slide member in predetermined positions, whereby the other end of the link member is slidably assembled with the inner holding channels, the other face of the slide member being formed with outer holding channels, the slide rail fixed in the elongated recess of the upper cover being formed with lateral wing sections, which are formed by means of continuously bending two sides of the slide rail, the lateral wing sections being slidably assembled in the outer holding channels of the slide member.

7. The auxiliary support device for flip touch screen as claimed in claim 1, wherein the other end of the link member has laterally protruding shaft sections, the slide member being formed with opposite inner holding channels on one face of the slide member in predetermined positions, whereby the other end of the link member is slidably assembled with the inner holding channels, the inner holding channels of the slide member extending from the bottom end to the other end by a predetermined length, pad blocks with a predetermined height being disposed in the base seat in a position displaced from the inner holding channels, whereby when the slide member overlaps the base seat, the link member is horizontally located in a space defined by the inner holding channels and the pad blocks.

8. An auxiliary support device for flip touch screen, comprising a main body as a system side and an upper cover having a touch panel liquid crystal screen, the main body being preformed with a cavity for assembling with a base seat, the upper cover being preformed with an elongated recess in a position corresponding to the cavity, a slide rail being assembled in the elongated recess, one end of a link member being movably pivotally connected with an outer end of the base seat, a bottom end of a slide member being movably pivotally connected with an inner end of the base seat, the slide member being slidably assembled in the slide rail, the other end of the link member being slidably connected with a preset section of a surface of the slide member;
  wherein the bottom end of the slide member is a sleeve section, a pivot unit and a support shaft being oppositely disposed on the base seat for movably pivotally connecting with the sleeve section.

9. The auxiliary support device for flip touch screen as claimed in claim 8, wherein the pivot unit is disposed at one end of a locating bar, the locating bar being locked in the cavity of the main body, the base seat being formed with an outward bent plate for concealing and protecting the locating bar, the outward bent plate being preformed with a concaved section for receiving the pivot unit, the base seat having a forked end, a connection seat being disposed in the cavity of the main body in a position corresponding to the forked end, the locating bar having an extension end, the extension end extending into the connection seat and being locked and connected with the connection seat by means of a locking member, the support shaft being located in a corresponding through hole preformed on an end section of the base seat.

10. The auxiliary support device for flip touch screen as claimed in claim 8, wherein the end of the link member has two lugs spaced from each other, the outer end of the base seat being formed with two opposite dents each having a shaft corresponding to the lug, the end of the link member being assembled with the dents with the shafts movably pivotally connected in the lugs, the other end of the link member having laterally protruding shaft sections, the slide member being formed with opposite inner holding channels on one face of the slide member in predetermined positions, whereby the other end of the link member is slidably assembled with the inner holding channels, the other face of the slide member being formed with outer holding channels, the slide rail fixed in the elongated recess of the upper cover being formed with lateral wing sections, which are formed by means of continuously bending two sides of the slide rail, the lateral wing sections being slidably assembled in the outer holding channels of the slide member.

11. The auxiliary support device for flip touch screen as claimed in claim 9, wherein the end of the link member has two lugs spaced from each other, the outer end of the base seat being formed with two opposite dents each having a shaft corresponding to the lug, the end of the link member being assembled with the dents with the shafts movably pivotally connected in the lugs, the other end of the link member having laterally protruding shaft sections, the slide member being formed with opposite inner holding channels on one face of the slide member in predetermined positions, whereby the other end of the link member is slidably assembled with the inner holding channels, the other face of the slide member being formed with outer holding channels, the slide rail fixed in the elongated recess of the upper cover being formed with lateral wing sections, which are formed by means of continuously bending two sides of the slide rail, the lateral wing sections being slidably assembled in the outer holding channels of the slide member.

12. The auxiliary support device for flip touch screen as claimed in claim 8, wherein the other end of the link member has laterally protruding shaft sections, the slide member being formed with opposite inner holding channels on one face of the slide member in predetermined positions, whereby the other end of the link member is slidably assembled with the inner holding channels, the inner holding channels of the slide member extending from the bottom end to the other end by a predetermined length, pad blocks with a predetermined height being disposed in the base seat in a position displaced from the inner holding channels, whereby when the slide member overlaps the base seat, the link member is horizontally located in a space defined by the inner holding channels and the pad blocks.

13. An auxiliary support device for flip touch screen, comprising a main body as a system side and an upper cover having a touch panel liquid crystal screen, the main body being preformed with a cavity for assembling with a base seat, the upper cover being preformed with an elongated recess in a position corresponding to the cavity, a slide rail being assembled in the elongated recess, one end of a link member being movably pivotally connected with an outer end of the base seat, a bottom end of a slide member being movably pivotally connected with an inner end of the base seat, the slide member being slidably assembled in the slide rail, the other end of the link member being slidably connected with a preset section of a surface of the slide member;
  wherein the end of the link member has two lugs spaced from each other, the outer end of the base seat being formed with two opposite dents each having a shaft corresponding to the lug, the end of the link member being assembled with the dents with the shafts movably pivotally connected in the lugs, the other end of the link member having laterally protruding shaft sections, the slide member being formed with opposite inner holding channels on one face of the slide member in predetermined positions, whereby the other end of the link member is slidably assembled with the inner holding channels, the other face of the slide member being formed with outer holding channels, the slide rail fixed in the elongated recess of the upper cover being formed with lateral wing sections, which are formed by means of continuously bending two sides of the slide rail, the lateral wing sections being slidably assembled in the outer holding channels of the slide member.

14. The auxiliary support device for flip touch screen as claimed in claim 13, wherein the other end of the link member has laterally protruding shaft sections, the slide member being formed with opposite inner holding channels on one face of the slide member in predetermined positions, whereby the other end of the link member is slidably assembled with the inner holding channels, the inner holding channels of the slide member extending from the bottom end to the other end by a predetermined length, pad blocks with a predetermined height being disposed in the base seat in a position displaced from the inner holding channels, whereby when the slide member overlaps the base seat, the link member is horizontally located in a space defined by the inner holding channels and the pad blocks.

\* \* \* \* \*